United States Patent [19]

Heylen et al.

[11] 3,984,345

[45] Oct. 5, 1976

[54] METHOD FOR REMOVAL OF ADHERING SODIUM FROM AND STORAGE OF IRRADIATED NUCLEAR FUEL ELEMENTS

[75] Inventors: Paul Raymond Heylen, Mol; Jean Van Impe, Rhode-St-Genese; Henri Lecerf, Antwerp, all of Belgium

[73] Assignees: Centre d'Etude de l'Energie Nucleaire, C.E.N.; E.N.I.-Electrische Nijverheids-Installaties; Belgonucleaire, all of Brussels, Belgium

[22] Filed: July 19, 1974

[21] Appl. No.: 490,105

[30] Foreign Application Priority Data
July 20, 1973   Belgium .............................. 802637

[52] U.S. Cl. ................. 252/301.1 W; 252/301.1 R; 423/5
[51] Int. Cl.² ........................................... G21F 9/06
[58] Field of Search ............. 252/301.1 R, 301.1 W; 423/5

[56] References Cited
OTHER PUBLICATIONS

Chem. Abstracts, vol. 56, No. 3090g.
Chem. Abstracts, vol. 71, No. 35252b.
Chem. Abstracts, vol. 78, No. 51515q.
Chem. Abstracts, vol. 79, No. 48384m.

*Primary Examiner*—Benjamin R. Padgett
*Assistant Examiner*—Deborah L. Kyle
*Attorney, Agent, or Firm*—Stevens, Davis, Miller & Mosher

[57] ABSTRACT

There is described a method for sodium-deactivating and/or stocking irradiated nuclear fuel elements, said elements being contacted with a fluid, in which use is made as fluid, of a molten salt mixture which is uncorrosive for the element stainless steels, inert relative to uranium and plutonium oxides by the deactivating temperature and reactive with sodium metal without producing a detonating gas.

6 Claims, 4 Drawing Figures

METHOD FOR REMOVAL OF ADHERING SODIUM FROM AND STORAGE OF IRRADIATED NUCLEAR FUEL ELEMENTS

This invention relates to a method for sodium-deactivating and/or stocking irradiated nuclear fuel elements, in which said elements are contacted with a fluid.

After irradiating thereof inside a sodium-cooled nuclear reactor, the fuel assemblies are usually retained inside the sodium pool of the reactor for cooling. They lie for instance during 30 days in said pool.

As it comes out of said sodium pool, the assembly has to be relieved from the adhering sodium; this operation is the sodium deactivating.

After deactivating and possibly metering, the assemblies can be stocked before conveying to the recovery plant.

For conveying the assemblies are arranged inside a container which is to insure the uncriticality of the conveyed fissile materials, the retaining of the fission products inside the container, the discharge of the radioactive decay heat as well as the absorption of gamma and neutron radiations from the irradiated fuel.

Deactivating is usually performed before conveying and buffer stocking is often provided between deactivating and conveying, but such a sequence does not have necessarily to be followed, even if usually deactivating comes before conveying so as to prevent conveying simultaneously sodium which is inflammable, and highly-radioactive fission products contained in the irradiated fuel.

The fluids presently used for sodium deactivating are generally mixtures of argon and steam or nitrogen and steam, which react according to strongly exothermic reactions.

The main drawback when using such fluids for sodium deactivating lies in the reactions being exothermic and in the danger of possible formation of a detonating mixture of hydrogen and oxygen due to a faulty occasional gas discharge.

For the buffer stocking between sodium deactivating on the one hand and conveying on the other hand, use is made up to now of the following heat-bearing fluids: an inert gas such as argon or helium and a liquid such as water, an organic liquid or a molten metal such as sodium or a mixture of sodium and potassium.

The use of every one of said fluids brings large drawbacks.

The main drawback when using an inert gas as heat-bearing fluid lies in the very low heat conductibility which requires consequently working with intricate installations for forced flow of the gases, and in the radioactive decay period in the reactor sodium pool having to be extended.

The drawback when using water as heat-bearing fluid lies in the limitation to a temperature of 100° C under atmospheric pressure. There is a danger of water boiling in the centre of the irradiated assemblies.

It is thus also required to let the fuel elements cool for a longer time period in the reactor sodium pool.

The organic liquids have also the drawback of a relatively low heat conductibility and boiling point; the main drawback of said liquids is however the deteriorating thereof because of radio-active damages due to gamma rays from the fission products.

Molten metals such as sodium or sodium-potassium bring a danger of inflammation and even of detonating when contacting air or water.

The invention has for object to obviate such drawbacks of the known methods for sodium-deactivating and/or for stocking irradiated nuclear fuel elements.

For this purpose, use is made as fluid according to the invention, of a molten salt mixture which is uncorrosive for the element stainless steels, inert relative to uranium and plutonium oxides by the deactivating temperature and reactive with sodium metal without producing a detonating gas.

Use is preferably made of an eutectic mixture.

In an advantageous embodiment of the invention, use is made of a mixture of $NaNO_3$, $KNO_3$ and $NaNO_2$.

In another embodiment of the invention, use is made of a mixture of $Na_2CO_3$, $K_2CO_3$ and $Li_2CO_3$.

In a further embodiment of the invention, use is made of a mixture of $NaCl$, $KCl$ and $ZnCl_2$.

In a particular embodiment of the invention, use is made of the same mixture both for sodium-deactivating and for stocking.

In a very advantageous embodiment of the invention, the elements are conveyed inside a container provided with one and the same mixture.

Other details and features of the invention will stand out from the description given below by way of non limitative example and with reference to the accompanying drawings, in which.

In the various figures, the same reference numerals pertain to similar elements.

In the present application, "irradiated nuclear fuel elements" should be taken as meaning needles comprised of a fissile material core and a sheath, or bundles of such needles, or assemblies of such needles, or else equivalent elements.

Mention will be made hereinafter of sodium deactivating, of stocking and conveying assemblies, but it must be understood that all of the operations described can also be performed on needles or needle bundles.

Figure 1:
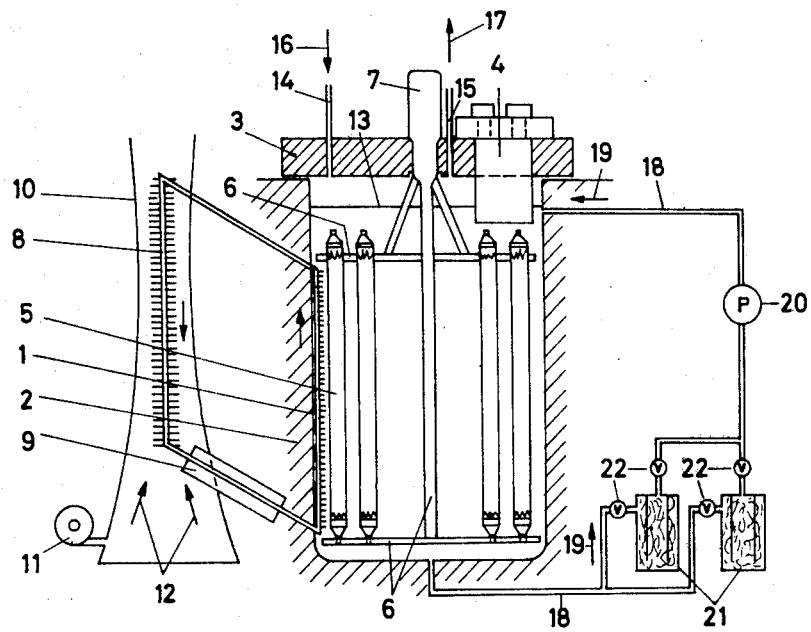
FIG. 1 is a diagrammatic view, partly in elevation and partly in cross-section of an installation for the working of a method for sodium-deactivating and/or stocking irradiated nuclear fuel elements according to the invention.
Figure 2:
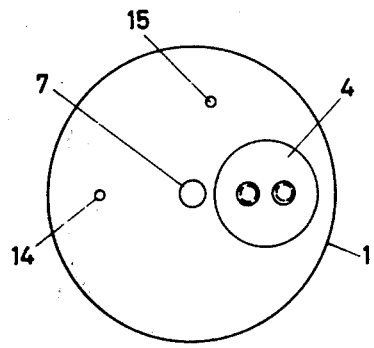
FIG. 2 is a diagrammatic plan view of part of the installation shown in FIG. 1.

The installation shown in FIGS. 1 and 2 is used either for stocking assemblies which have already been sodium-deactivated inside a separate installation, or for sodium deactivating proper of the assemblies.

Inside said installation can be stocked ninety fuel elements which have been irradiated inside the core of the SNR-300 reactor. The installation is designed for that case where said fuel elements are discharged after ten-day cooling and have a residual radio-active decay heat in the range of 10 Kw.

The installation comprises an AISI 316 L-stainless steel tank 1 with an inner diameter of 5.5 m and an inner height of 6.5 m, which is surrounded by a biological casing 2. Said tank is provided with a cover 3 having a loading and unloading channel 4.

The irradiated nuclear fuel assemblies 5 are introduced inside tank 1 through channel 4 for sodium-deactivating and/or stocking thereof; said assemblies are also discharged from said tank through the same channel after stocking.

The tank comprises a turret 6 of AISI 316 L steel which is provided with a driving device 7 and supports inside which can be stocked ninety fuel assemblies with a 30 cm spacing in two concentric series. By means of the driving device 7, the turret can be brought to succeeding positions in which a pair of recesses lie in front of the suitable locations of channel 4 for introducing or discharging assemblies.

A closed loop 8 made of AISI 316 L steel and filled with a heat-bearing fluid such as molten salts with the same composition as the molten salts filling tank 1 the composition of which will be detailed hereinafter, is located partly inside tank 1 and partly outside said tank.

Outside said tank, loop 8 is surrounded by an electric resistor 9 with a power of 1 MW as required for initially melting the salts and said loop is partly located inside a stack 10 through which cooling air can be forced by a fan 11 along the direction of arrows 12.

The tank is thus provided with heating and cooling means to allow maintaining the temperature of the molten salts contained therein, at a value slightly higher than the melting temperature thereof given hereinafter.

Said tank is filled up to the 5.5 m level 13 with molten salts the composition of which will be detailed hereinafter. The electric resistor 9 and the closed loop 8 for the heat-bearing liquid allow to bring the salts inside the tank above the melting temperature.

During the stocking of the assemblies inside the tank, the decay heat can reach at the most 900 Kw. Heat is removed through that same liquid flowing in loop 8, which is then cooled by air forced through stack 10 by fan 11, or heat is supplied by the electric resistor so as to maintain the salts at a temperature higher than the melting temperature.

An iner gas circuit with a maximum flow rate up to about 100m³/h carries the gaseous fission products possibly present above the bath to a gas-purifying installation. Said scavenging gas is supplied to the tank through a feeding pipe 14 with an inner diameter of 60 mm and it is discharged therefrom through an outlet pipe 15 with the same diameter leading to a gas-purifying installation (not shown). The gas thus flows along the direction of arrows 16 and 17.

The stocking salts flow through pipes 18 of AISI 316 L steel along the direction of arrows 19. In the one pipe 18 is cut-in a pump 20 with a flow rate of about 12 m³/h for instance. In parallel portions of pipes 18 are cut-in removable filters 21 of stainless steel wool according to standard AISI 316. Valves 22 allow cutting either one of said filters in the circuit. In the disconnected filter, the removable steel wool packing can then be replaced by a new packing. Said filters relieve the stocking salts from insoluble particles which can be comprised of solid nuclear fuel scraps, of stainless steel scraps for example of W.Nr.1.49.81 or AISI 304 L standard from the fuel assemblies, as well as of products formed during the reaction between the sodium and the molten salts.

The bath contacting inside tank 1 the fuel assemblies 5 is an eutectic mixture of molten salts, which is not corrosive for the element stainless steel, inert for the uranium and plutonium oxides by the deactivating temperature, and reacting with sodium metal without producing a detonating gas.

Three mixtures are particularly suitable for this bath.

The first mixture is a ternary eutectic mixture of alkaline nitrates and nitrites. It comprises about 6% by weight of $NaNO_3$, about 52% by weight of $KNO_3$ and about 42% by weight of $NaNO_2$. The melting temperature of said bath is about 150° C.

A second mixture is a ternary eutectic mixture of stable alkaline and alkaline-earth carbonates. It comprises about 33.5% by weight of $Na_2CO_3$, about 34.5% by weight of $K_2CO_3$ and about 32% by weight of $Li_2CO_3$. The melting temperature of said mixture is about 395° C.

A third mixture which can be used is a ternary eutectic mixture of chlorides. It comprises about 20 mole % of NaCl, about 20 mole % of KCl and about 60 mole % of $ZnCl_2$. The melting temperature of this bath is about 203° C.

It is to be noted that each one of the above mixtures has a sodium-deactivating action, is consistent with the subsequent step of buffer stocking and also with the step of conveying under molten salts.

Figure 3:
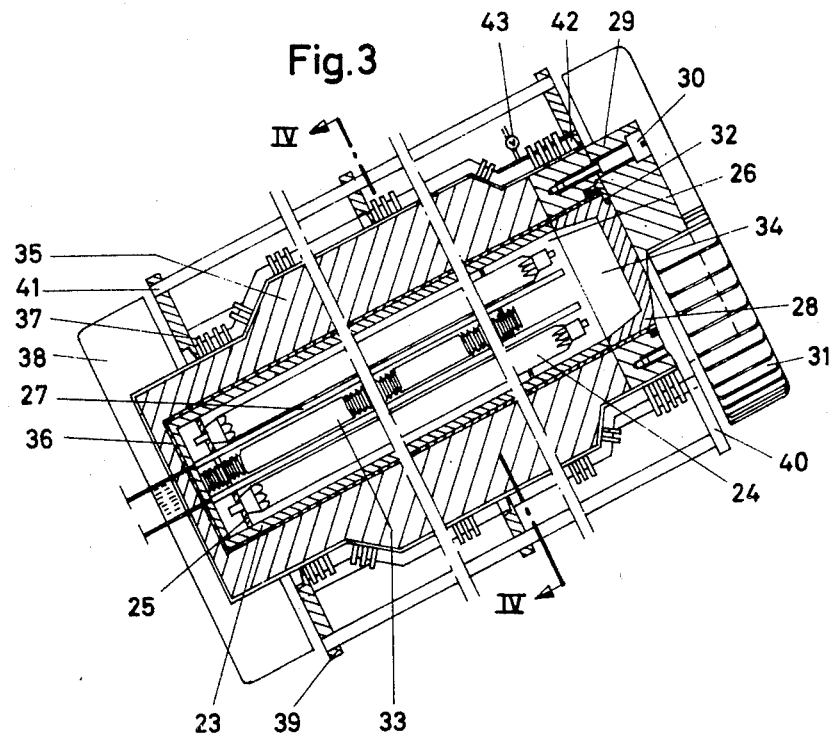
FIG. 3 is a diagrammatic view partly in cross-section and partly in elevation of a container for conveying irradiated nuclear fuel elements which have been sodium-deactivated and/or stocked by a method according to the invention, said container also being usable for the working of a sodium-deactivating method according to the invention.
Figure 4:
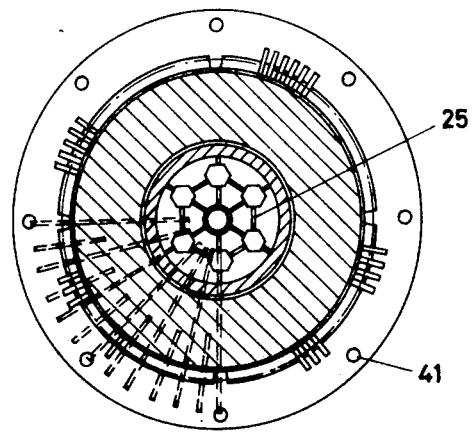
FIG. 4 is a section view along line IV—IV in FIG. 3.

The sodium-deactivated and possibly stocked assemblies either inside an installation as shown in FIGS. 1 and 2, or inside another installation, can be conveyed by means of the container shown in FIGS. 3 and 4, or of other containers.

The container shown in FIGS. 3 and 4 can also be used for sodium deactivating.

Said container comprises an enclosure 23 of stainless steel which can receive six nuclear fuel assemblies 24. For this purpose, the enclosure 23 comprises supports 25 allowing the convection of the heat-bearing fluid 26. To bring the salt mixture comprising the heat-bearing fluid 26 to the melting temperature thereof, the enclosure is provided with heating units 27. The heating units 27 are connected to an electric energy source when loading the nuclear fuel assemblies.

In FIG. 3, the container has been shown in the conveying slanted position thereof. By the loading, the container lies in a vertical position.

As heat-bearing fluid, use is made of one of the above-described mixtures. Said molten salts can perform the sodium deactivating. Once the container has been loaded with said assemblies and the sodium possibly still adhering to the fuel has completely disappeared in the molten salts, two covers 28 and 29 come in succession on top of said container in vertical position. The safety cover 29 closes the container by means of securing means 30. Cover 29 is cooled by means of cooling fins 31, which also provide some protection against impacts. Joints 32 insure sealing of the covers. Two expansion chambers 33 and 34 let the retained gas and the molten salts 26 expand. The container is provided with a biological casing 35 of uranium. The uranium is completely covered with a ductile stainless steel plate 36 the outer side of which is covered with copper cooling fins 37.

On the bottom are also provided cooling and impact-damping fins 38.

The container is also protected from side impacts by means of a cage comprised of disks 39 and 40 and rods 41.

A jacket 42 of boron water with an addition of antifreeze is located outside the biological uranium screen 35; said jacket is provided with a safety valve 43.

In case of fire, the boron water with antifreeze added which comprises the neutron screen, vaporizes through said valve 43 while absorbing the calories.

It is particularly important to note that the same eutectic salt mixtures can be used both for the sodium deactivating method and for the possible buffer stocking and conveying.

If the installation as shown in FIGS. 1 and 2 or the container shown in FIGS. 3 and 4 was to show by accident a crack, such crack would be sealed by the salt mixture.

It is clear that should sodium logging occur, it would most probably be neutralized by the eutectic molten salt mixture.

It must be understood that the invention is in no way limited to the above embodiments and that many changes can be brought therein without departing from the scope of the invention as defined by the appended claims.

For instance, the method according to the invention could be worked with another installation and with another container than the ones described above.

There is no limitative character in the number of elements the installation can contain, the tank size, the power of the electric resistor, the flow rate of the inert gas carrying the gaseous fission products, the nature of the filters and the other qualitative and quantitative data given hereinabove.

We claim:

1. A method for removal of adhering sodium from irradiated nuclear fuel elements consisting of introducing the nuclear fuel elements into a bath of a eutectic molten salts mixture having a composition selected from the group consisting of:
   a. $NaNO_3$, $KNO_3$ and $NaNO_2$,
   b. $Na_2CO_3$, $K_2CO_3$ and $Li_2CO_3$, and
   c. $NaCl$, $KCl$ and $ZnCl_2$
whereby the sodium is removed from the elements.

2. The method of claim 1 wherein (a) contains 6 w% $NaNO_3$, 52 w% $KNO_3$ and 42 w% $NaNO_2$, (b) contains 33.5 w% $Na_2CO_3$, 34.5 w% $K_2CO_3$ and 32 w% $Li_2CO_3$, and (c) contains 20 mole % $NaCl$, 20 mole % $KCl$ and 60 mole % $ZnCl_2$.

3. Method for storing irradiated nuclear fuel elements consisting of introducing the nuclear fuel elements into a bath of a eutectic molten salts mixture having a composition selected from the group consisting of
   a. $NaNO_3$, $KNO_3$, and $NaNO_2$,
   b. $Na_2CO_3$, $K_2CO_3$ and $Li_2CO_3$, and
   c. $NaCl$, $KCl$ and $ZnCl_2$,
and maintaining the irradiated nuclear fuel elements in said bath.

4. The method of claim 3, wherein (a) contains 6 w% $NaNO_3$, 52 w% $KNO_3$ and 42 w% $NaNO_2$, (b) contains 33.5 w% $Na_2CO_3$, 34.5 w% $K_2CO_3$ and 32 w% $Li_2CO_3$, and (c) contains 20 mole % $NaCl$, 20 mole % $KCl$ and 60 mole % $ZnCl_2$.

5. A method for removal of adhering sodium and for transportation of irradiated nuclear fuel elements comprising introducing the nuclear fuel elements into a tank comprising a eutectic molten salts mixture having a composition selected from the group consisting of
   a. $NaNO_3$, $KNO_3$ and $NaNO_2$,
   b. $Na_2CO_3$, $K_2CO_3$ and $Li_2CO_3$, and
   c. $NaCl$, $KCl$ and $ZnCl_2$,
discharging the nuclear fuel elements from the tank, arranging the nuclear fuel elements inside a container containing a eutectic molten salts mixture having the same composition as the mixture contained in the tank and transporting the container containing the nuclear fuel elements.

6. The method of claim 5 wherein (a) contains 6 w% $NaNO_3$, 52 w% $KNO_3$ and 42 w% $NaNO_2$, (b) contains 33.5 w% $Na_2CO_3$, 34.5 w% $K_2CO_3$ and 32 w% $Li_2CO_3$, and (c) contains 20 mole % $NaCl$, 20 mole % $KCl$ and 60 mole % $ZnCl_2$.

* * * * *